(12) United States Patent
Preston

(10) Patent No.: US 8,405,291 B2
(45) Date of Patent: Mar. 26, 2013

(54) MICROWAVE LIGHT SOURCE WITH SOLID DIELECTRIC WAVEGUIDE

(75) Inventor: Barry Preston, Melton Mowbray (GB)

(73) Assignee: Ceravision Limited

(*) Notice: Subject to any disclaimer, the term of this patent is extended or adjusted under 35 U.S.C. 154(b) by 0 days.

(21) Appl. No.: 13/128,019

(22) PCT Filed: Nov. 14, 2008

(86) PCT No.: PCT/GB2008/003811
§ 371 (c)(1),
(2), (4) Date: May 25, 2011

(87) PCT Pub. No.: WO2010/055275
PCT Pub. Date: May 20, 2010

(65) Prior Publication Data
US 2011/0221326 A1   Sep. 15, 2011

(51) Int. Cl.
*H01J 5/16* (2006.01)
*H01J 11/00* (2006.01)
(52) U.S. Cl. .................... 313/113; 313/110; 313/567
(58) Field of Classification Search ............ None
See application file for complete search history.

(56) References Cited

U.S. PATENT DOCUMENTS

| 4,266,167 | A | 5/1981 | Proud |
| 5,227,698 | A | 7/1993 | Simpson |
| 5,834,895 | A | 11/1998 | Dolan |
| 6,093,921 | A | 7/2000 | Gaisford |
| 6,476,557 | B1 | 11/2002 | Leng |
| 6,570,397 | B2 * | 5/2003 | Mayder et al. .......... 324/750.02 |
| 6,737,809 | B2 * | 5/2004 | Espiau et al. .................. 315/39 |
| 7,429,818 | B2 * | 9/2008 | Chang et al. .............. 313/231.31 |
| 7,701,143 | B2 * | 4/2010 | DeVincentis ................... 315/39 |
| 7,719,195 | B2 * | 5/2010 | DeVincentis et al. .......... 315/39 |
| 2002/0011802 | A1 | 1/2002 | Espiau |
| 2002/0030453 | A1 | 3/2002 | Kirkpatrick |
| 2003/0030453 | A1 * | 2/2003 | Mayder et al. ................ 324/754 |
| 2005/0057158 | A1 | 3/2005 | Chang |
| 2005/0286263 | A1 | 12/2005 | Champion |
| 2007/0171006 | A1 | 7/2007 | DeVincentis |
| 2007/0222352 | A1 | 9/2007 | Devincentis |
| 2011/0309744 | A1 * | 12/2011 | Preston et al. .................. 315/34 |

FOREIGN PATENT DOCUMENTS

| WO | 2005117069 | 12/2005 |
| WO | 2006129102 | 12/2006 |
| WO | 2011015807 | 2/2011 |
| WO | 2011048359 | 4/2011 |

* cited by examiner

Primary Examiner — Natalie Walford
(74) Attorney, Agent, or Firm — Jennifer Meredith, Esq.; Meredith & Keyhani, PLLC

(57) ABSTRACT

A light source comprising a lucent waveguide of solid dielectric material having: an at least partially light transmitting Faraday cage surrounding the waveguide, a bulb cavity within the waveguide and the Faraday cage and an antenna re-entrant within the waveguide and the Faraday cage and a bulb having a microwave excitable fill, the bulb being received in the bulb cavity.

32 Claims, 4 Drawing Sheets

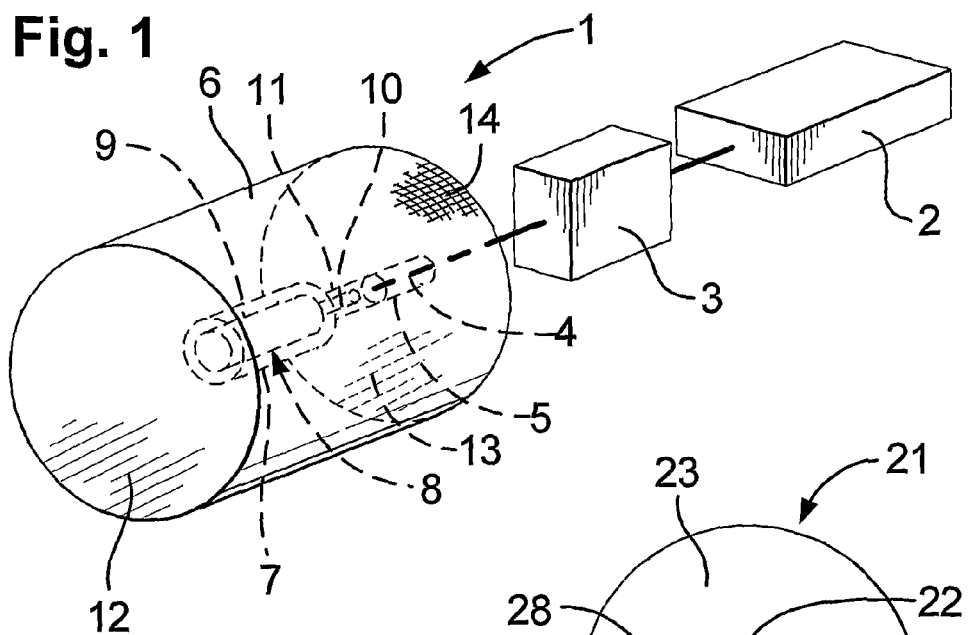

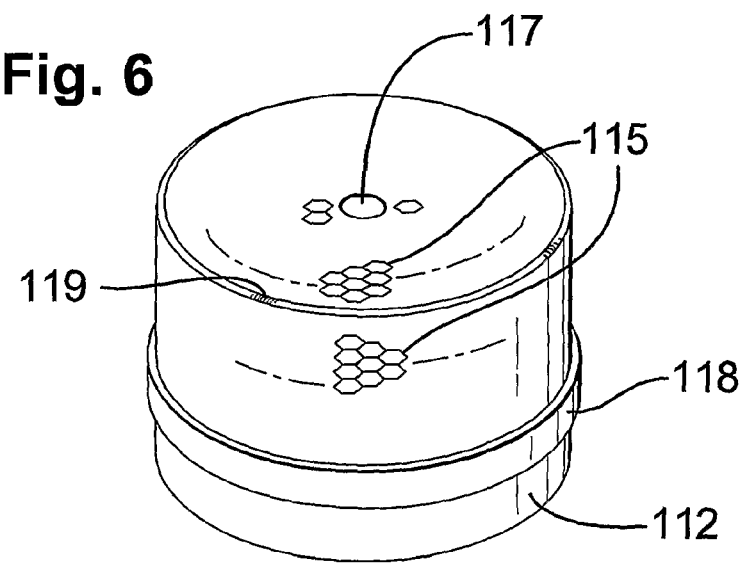
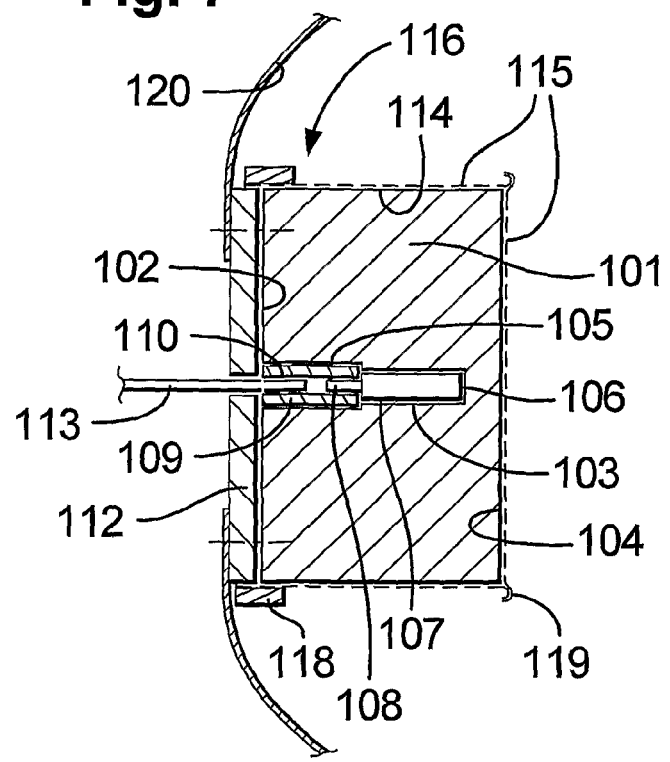

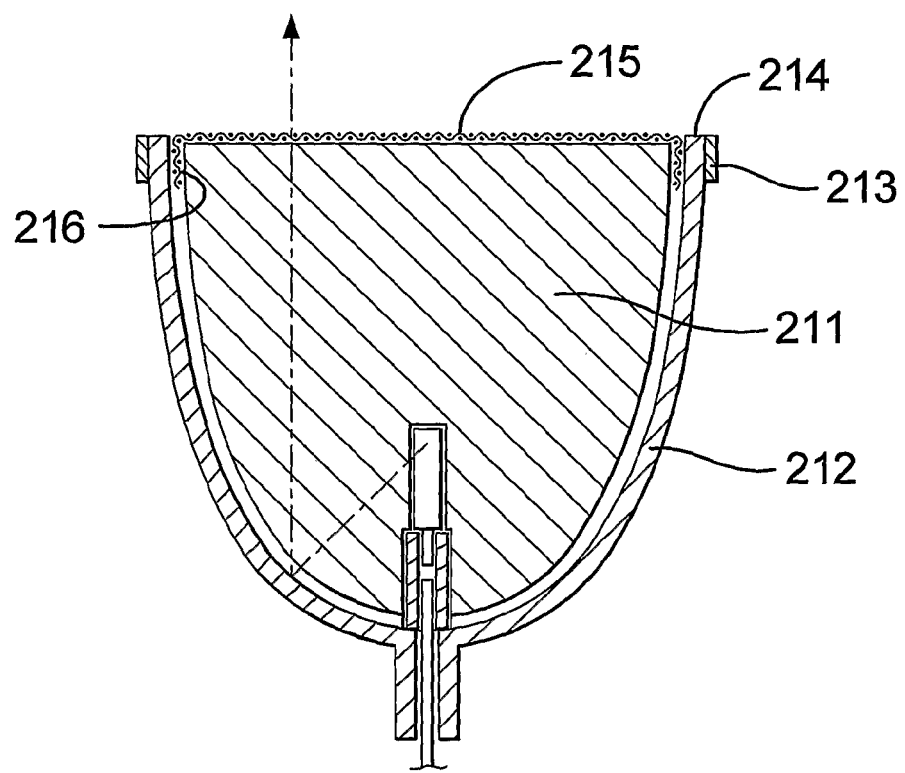

MICROWAVE LIGHT SOURCE WITH SOLID DIELECTRIC WAVEGUIDE

This application is a national stage entry of and claims priority to application PCT/GB2008/003811 filed Nov. 14, 2008.

The present invention relates to a light source for a microwave-powered lamp.

It is known to excite a discharge in a bulb with a view to producing light. Typical examples are sodium discharge lamps and fluorescent tube lamps. The latter use mercury vapour, which produces ultraviolet radiation. In turn, this excites fluorescent powder to produce visible light. Such lamps are more efficient in terms of lumens of light emitted per watt of electricity consumed than tungsten filament lamps. However, they still suffer the disadvantage of requiring electrodes within the lamp. Since these carry the current regard for the discharge, they degrade and ultimately fail.

We have developed electrodeless bulb lamps, as shown in our patent application Nos. PCT/GB2006/002018 for a lamp (our "'2018 lamp"), PCT/GB2005/005080 for a bulb for the lamp and PCT/GB2007/001935 for a matching circuit for a microwave-powered lamp. These all relate to lamps operating electrodelessly by use of microwave energy to stimulate light emitting plasma in the bulbs. Earlier proposals involving use of an airwave for coupling the microwave energy into a bulb have been made for instance by Fusion Lighting Corporation as in their U.S. Pat. No. 5,334,913. If an air wave guide is used, the lamp is bulky, because the physical size of the wave guide is a fraction of the wave length of the microwaves in air. This is not a problem for street lighting for instance but renders this type of light unsuitable for many applications. For this reason, our '2018 lamp uses a dielectric wave-guide, which substantially reduces the wave length at the operating frequency of 2.4 Ghz. This lamp is suitable for use in domestic appliances such as rear projection television.

Some eight years ago our partners in the microwave excited light business engaged the founders of Luxim Inc ("Luxim") in a consultancy arrangement. On 31 Jul. 2000, Luxim filed a U.S. provisional patent application No. 60/222,028, following which U.S. Pat. No. 6,737,809 was granted in due course ("the Luxim Patent"). Its abstract is as follows: "A dielectric waveguide integrated plasma lamp (DWIPL) with a body consisting essentially of at least one dielectric material having a dielectric constant greater than approximately 2, and having a shape and dimensions such that the body resonates in at least one resonant mode when microwave energy of an appropriate frequency is coupled into the body. A bulb positioned in a cavity within the body contains a gas-fill which when receiving energy from the resonating body forms a light-emitting plasma."

We believe that this is the first disclosure of a solid dielectric wave guide for coupling microwave energy into an electrodeless bulb. At that time the focus of attention was on a marked reduction in size achievable by use of a solid dielectric. Our own involvement with the project was in ceramic expertise. The chosen ceramic was alumina.

Our U.S. Pat. No. 6,666,739 predates the above mentioned consultancy arrangement. Its abstract is as follows: "The lamp consists of a hollow tubular body with a closed end and an open end. The body is of sintered ceramic material. A window is sealed across the open end, the window and the body being united by a layer of frit. The window is of sapphire. Within the body is sealed an inert gas atmosphere and a pellet charge of excitable material. In use, the lamp is subjected to RF electromagnetic radiation which heats it to 1000° C. causing it to emit visible light via the sapphire."

Not only is alumina opaque, in the form used, but also the wave guide was plated with silver to provide boundary conditions for the resonant electric field within the wave guide. In the Luxim patent, it was proposed that light should be emitted via a sapphire window.

We are unaware of any proposal since the collaboration mentioned above to use a solid dielectric wave guide that does not use a separate bulb enclosing microwave excitable material—the bulb normally being of quartz—in a recess in an opaque wave guide—normally of alumina—or an integrated arrangement of a transparent window closing a recess in an opaque wave guide and enclosing microwave excitable material.

In pursuit of improvements in our microwave excited light technology, Andrew Neate invented a coalescing of a bulb and wave guide into a single component in another way. Consequently, we filed our patent application No 0722548.5 on 16 Nov. 2007, referred to here as our first LER (Light Emitting Resonator) patent application. It described a visible light source for a lamp to be powered by a microwave source having:
  an enclosure, which is transparent to visible light and opaque 'to microwaves, and resonant on microwave excitation,
  a fill of material excitable by microwave energy to form a plasma emitting visible light and
  an antenna within the enclosure positioned for plasma-inducing excitation of microwave resonance within the enclosure, the antenna having a connection extending outside the enclosure for coupling to the microwave source.

In development of our first LER, which was at first envisaged as a relatively large enclosure with a relatively thin wall and the antenna in the enclosed void containing the fill, we developed our second LER in which the enclosed space was relatively smaller and the antenna was positioned within the material of the enclosure.

Thus, we filed our patent application No 0809471.6 on 23 May 2008, referred to here as our second LER (Light Emitting Resonator) patent application. It described a visible light source to be powered by microwave energy, the source having:
  a solid plasma container of material which is transparent or translucent for exit therefrom, the plasma container having a sealed void in the plasma container,
  a Faraday cage surrounding the plasma container, the cage being at least partially light transmitting for light exit from the plasma container, whilst being microwave enclosing,
  a fill in the void of material excitable by microwave energy to form a light emitting plasma therein, and
  an antenna arranged within the plasma container for transmitting plasma inducing
microwave energy to the fill, the antenna having:
    a connection extending outside the plasma container for coupling to a source of microwave energy;
the arrangement being such that light from a plasma in the void can pass through the plasma container and radiate from it via the cage.

We have now further developed the LER and related technology, and Andrew Neate and Barrie Preston jointly made the present invention which provides an advantage of the LER in a lamp using our '2018 bulb.

According to the invention there is provided a light source comprising:
  a lucent waveguide of solid dielectric material having:

an at least partially light transmitting Faraday cage surrounding the waveguide, a bulb cavity within the waveguide and the Faraday cage and an antenna re-entrant within the waveguide and the Faraday cage and a bulb having a microwave excitable fill, the bulb being received in the bulb cavity.

As used in this specification: "lucent" means that the material, of which the item described as lucent is formed, is transparent or translucent.

A lamp using this light source has advantage over the lamp of the patent '809 in that light radiating laterally from the bulb as well as axial light can be collected and utilised. In the '809 patent axial light only from one end of the bulb only can be utilised.

Normally the waveguide will be dimensioned for microwave resonance with the cavity at a position of field maximum for optimum excitation of the fill. In the preferred embodiments, the waveguide is of circular cross-section and is dimensioned for a half wave to extend diametrically within it.

Preferably, an envelope of the bulb and the lucent wave guide are of the same material.

The bulb cavity can be open, depending from a surface of the waveguide as in the '809 patent. However, we prefer to place the bulb more deeply in the waveguide. We achieve this either by:

1. Providing a bore into the waveguide, past half its depth, inserting a bulb into the bore and closing the bore with a plug of the material of which the wave guide is made. Whilst it is not essential, though possible, to seal the plug to the waveguide, it is preferably fixed to it, conveniently by a local fusion spot;

2. Providing the waveguide in two halves, which when closed together provide the bulb cavity. Again the two halves, which need not be equal nor symmetric halves, can be spot fused together.

Where the crucible and the plug are of vitreous material, the plug and crucible or the two halves of the latter as the case can be is fixed or sealed together by local melting of the material of the plug at the step and/or the counter-bore. Where they are of ceramic material, they are fixed or sealed together by local melting of frit material. The local melting can be effected by laser.

In either case, the bulb can be free inside the cavity. However, it is preferably fixed with respect to the cavity. Suitably this can be achieved by spot fusing a stem of the bulb in a correspondingly sized bore extending from the cavity.

It is possible to retain the bulb in its cavity with the Faraday cage.

In one particular embodiment:

the bulb is retained in the cavity by a tube of dielectric material;

the surface at which the cavity opens is a back surface of the lucent waveguide and the tube is retained by a portion of the Faraday cage;

the bulb has an extension locating in an inner end of the tube;

the tube provides the antenna re-entrant;

the Faraday cage includes a solid portion extending across a back of the lucent waveguide to a transverse extent thereof and a clamp clamping the solid portion and the waveguide together and connecting the solid portion to a light transmitting, front portion of the Faraday cage;

the lucent wave guide and the solid portion of the waveguide are complementarily shaped for emitted light focus; and the light transmitting forward portion of the Faraday cage includes a reticular metallic element or a lucent, conductive coating. These features can be utilised individually or collectively.

The Faraday cage can include at least one aperture for locally increasing light transmission therethrough. Preferably the aperture is no bigger than one tenth of the free space wave length of the microwaves in the crucible. Typically for operation at 2.45 GHz, the aperture would be no bigger than $\frac{1}{10} \times$ 12.24 cm, i.e. 12.24 mm and for 5.8 GHz no bigger than 6.12 mm.

It is envisaged that the plasma crucible will be of quartz or sintered, transparent ceramic material, although other materials may also be suitable. In particular; the ceramic material can be translucent or transparent.

An example of a suitable translucent ceramic is polycrystalline alumina and example of a transparent ceramic is polycrystalline Yttrium Aluminium Garnet—YAG. Other possible materials are aluminium nitride and single crystal sapphire.

Preferably, the material of the bulb and the material of the waveguide have the same coefficients of thermal expansion, conveniently by providing them of the same material. Nevertheless, the bulb is likely to run hotter than the cavity, particularly where it is of relatively low thermal conductivity, and clearance is preferably provided for expansion of the bulb. NB, quartz has low conductive compared with alumina.

Whilst the antenna will normally be placed in the antenna re-entrant and held there by other mechanical constraints in the light source, it is envisaged that the antenna could be secured in the waveguide, for instance by fusing of material of the waveguide around the antenna, closing the re-entrant.

Preferably the lamp also includes a source of microwaves and a matching circuit as a single integrated structure.

To help understanding of the invention, various specific embodiments thereof will now be described with reference to the accompanying drawings, in which:

FIG. 1 is a diagrammatic perspective view of a bulb, lucent wave guide and microwave source of a lamp having a light source in accordance with the invention;

FIG. 2 is a cross-sectional side view of the bulb and lucent waveguide of FIG. 1;

FIG. 3 is an end view of the lucent waveguide;

FIG. 6 is a perspective view of a waveguide according to the present invention;

FIG. 7 is a side view of a waveguide according to the present invention; and

FIG. 8 is a side view of a waveguide according to the present invention.

Figure 4:
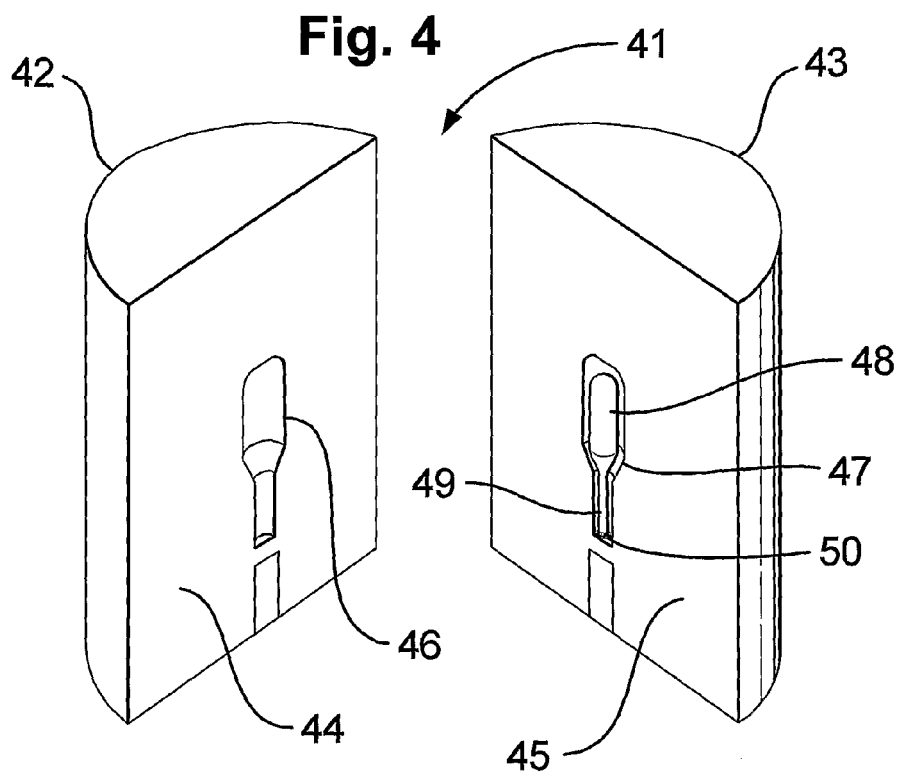
FIG. 4 is an exploded view of an alternative lucent waveguide.

Referring to the drawings, FIG. 1 shows a generic representation of a lamp 1 which comprises an oscillator and amplifier source 2 of microwave energy, typically operating at 2.45 or 5.8 GHz or other frequencies within an ISM band. The source passes the microwaves via a matching circuit 3 to an antenna 4 extending into a reentrant 5 in a lucent waveguide 6. This is of quartz and has a central cavity 7 accommodating a bulb 8. The bulb is a sealed tube 9 of quartz and contains a fill of noble gas and a microwave excitable material, which radiates visible light when excited by microwaves. The bulb has a stem 10 received in a stem bore 11 extending from the central cavity. The waveguide is transparent and light from the bulb can leave it in any direction, subject to any reflective surfaces. Microwaves cannot leave the waveguide, which is limited at its surfaces by a Faraday cage. Typically this comprises an ITO coating 12 on a front face of the waveguide, a light reflective coating 10, typically of silver with silicon monoxide coating 13 on a rear face and a wire mesh 14, which contacts both the ITO and light reflective coatings and is grounded, the wire mesh extending around sides of the waveguide between the front and back surfaces. Light can pass through the wire mesh for collection and use. The wave guide will be shaped and dimensioned to establish an electric field maximum at the bulb when driven at the selected microwave frequency. The dimensioning, taking account of the dielectric constant of the quartz of the waveguide is believed to be within the capabilities of the man skilled in the art.

One physical configuration of the light source comprising bulb and waveguide is shown in FIGS. 2 & 3. The quartz waveguide 21 is unitary with a bore 22 from one face 23. The bore extends to some 60% of the thickness of the waveguide at full diameter 24 for the bulb body 25 and then on at a clearance diameter 26 for the bulb stem 27. A plug 28 fills the bore on top of the bulb and is fixed in place by fusing 29 of the waveguide and plug material at the orifice 30 of the bore as by laser sealing. For this, a laser is focused on the joint line 31 between the plug and the waveguide at the orifice and traversed around the joint line, locally melting the quartz, which freezes again quickly fixing the plug into the waveguide. Provided the fusing is continuous around the plug, a seal is formed. On the opposite face 32, where the stem protrudes from the stem bore, a similar laser operation is performed. If necessary, the faces 23,33 are subsequently polished to remove any spatter. Thus the wave guide becomes a unitary whole with the bulb.

It should be noted that where the bulb envelope and the waveguide are both of quartz, such sealing of the material alone is possible. Where they are of lucent polycrystalline alumina, a glass frit is introduced at the seal and it is this which fuses, fixing and sealing the components.

The Faraday cage can be applied subsequently. Whilst the antenna and its reentrant are shown to be coaxial in FIG. 1, the re-entrant 33 in this embodiment is placed eccentrically in FIG. 2.

Figure 5:
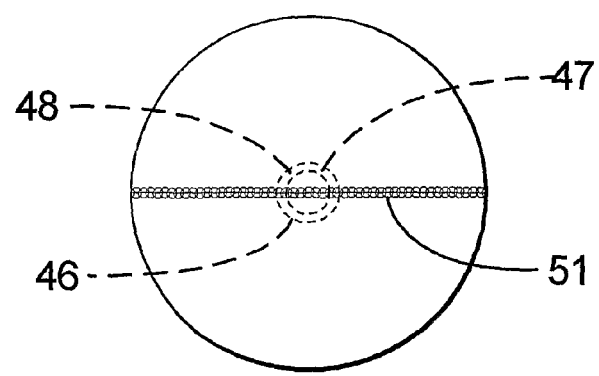
FIG. 5 is an end view of the alternative waveguide.

Another physical configuration is shown in FIGS. 4 & 5. The waveguide 41 is of two complementary parts 42,33. These have mating faces 44, 45 in which are provided recesses 46,47 equivalent to the bore 22 and the stem extension 26. The bulb 48 is laid in the recess in one part and the stem 49 is laser tacked 50 to its recess, at the distal end of the stem, where thermal stresses in use can be expected to be a minimum. The other part is added and the two are laser sealed 51 together around the periphery of their joint faces. These will have been polished flat, so that once they are united, the fact that the waveguide is comprised of two parts has no effect on its behaviour as a microwave resonant wave guide. Thus again, the waveguide becomes a unitary whole with the bulb.

Whilst the above embodiments have been described as being of quartz, that is to say both the bulb and the waveguide are of quartz, they could be of other material. In particular the following materials are believed to be suitable in that they are or can be made transparent or at least translucent:

fused silica, sapphire, polycrystalline alumina (PCA), yttrium aluminium gamet (YAG) and aluminium nitride.

The invention is not intended to be restricted to the details of the above described embodiment. For instance, whilst the drawings show waveguides that are circular cylindrical in shape, with equal length to diameter and the antenna re-entrant usually on their central axis, the length to diameter ratio can be altered to make them either short and fat or tall and thin. Equally, the antenna can be placed eccentric as shown in FIG. 2. It can be sealed in, i.e. the re-entrant sealed with the antenna in place, or the re-entrant can be left open with the antenna inserted.

Also the waveguide can be of different geometric shapes, such as cuboidal, again with dimensions chosen to suit resonance. Indeed, it is not essential for the waveguide to be driven in resonance.

Referring on to FIGS. 5 and 6, the light source there shown has a squat circular quartz waveguide 101 of 50.8 mm diameter and 35 mm height. From a back surface 102, there extends centrally into the waveguide a 5 mm diameter bore 103, penetrating to within 5 mm of a front face 104 of the waveguide. It has a counter bore 105 of 6 mm extending 15 mm. A 5 mm diameter quartz electrodeless bulb 106, a '2018 bulb, with a 15 mm body 107 and a 5 mm long 2 mm diameter stem 108 is positioned in the bore 103. A 15 mm long quartz tube 109 is received in the counter bore and receives the stem in its bore 110. With the tube flush with the back surface 102, of the waveguide, the bulb is captivated.

An aluminium ground plane 112 is positioned in contact with the back face to captivate the tube 109 and hence the bulb. Centrally and insulated from it extends an antenna 113, which protrudes into the bore 110, for feeding microwaves from nonshown drive circuitry to establish resonance in the waveguide and a light emitting plasma in the bulb.

Around the circumference 114 of the waveguide and across its from extends reticular metal foil 115 forming, with the ground plane a Faraday cage 116. Centrally in line with an end of the bulb is an aperture 117 in foil to allow unimpeded emission of axial light from the bulb. The majority of the radial light passes through the reticular foil at the circumference 114. A clamp 118 secures the back plane 112 and the waveguide together, at the same time connecting the back plane to the reticular foil. The foil on the circumference is crimped 119 to that on the front face.

This light source is mounted at the focus of a reflector 120 shown in partially, in FIG. 7.

Turning to FIG. 8, a variant is shown in which the waveguide 211 is of paraboloid shape, with a complementary back plane 212. This directs light emitted by the bulb forwards of the waveguide. The back plane has a clamp 213 at its front edge 214, both clamping the waveguide within the backplane and a wire mesh 215 across the front of the waveguide via a rim 216 clamped between the back plane and the wave guide. The wire mesh completes the Faraday cage of this light source. It has a similar location via a tube of its bulb.

In a non-illustrated alternative, the bulb is received in an open cavity in the from of the waveguide and is retained thereby the wire mesh.

The invention claimed is:

1. A light source comprising:
a lucent waveguide of solid dielectric material having:
an at least partially light transmitting Faraday cage surrounding the waveguide, wherein the Faraday cage transmits at least a portion of the light radially,
a bulb cavity within the waveguide and the Faraday cage and
an antenna and an antenna re-entrant within the waveguide and the Faraday cage, and
a bulb having a microwave excitable fill, the bulb being received in the bulb cavity.

2. A light source as claimed in claim 1, wherein the waveguide is dimensioned for microwave resonance with the cavity at a position of field maximum strength.

3. A light source as claimed in claim 2, wherein the waveguide is of circular cross section and is dimensioned for a half wave to extend diametrically within it.

4. A light source as claimed in claim 1, wherein an envelope of the bulb and the lucent waveguide are of the same material.

5. A light source as claimed in claim 1, wherein the bulb cavity opens at a surface of the lucent waveguide.

6. A light source as in claim 1, wherein the bulb cavity is closed.

7. A light source as claimed in claim 6, wherein the bulb cavity is closed by a plug of solid dielectric material.

8. A light source as claimed in claim 7, wherein the plug is fixed to the lucent wave guide.

9. A light source as claimed in claim 8, wherein the plug is sealed to the lucent waveguide.

10. A light source as claimed in claim 6, wherein the lucent wave guide is of two parts, one or both having the cavity formed at a common joint surface of the two parts.

11. A light source as claimed in claim 10, wherein the two parts are fixed together.

12. A light source as claimed in claim 11, wherein the two parts are sealed together.

13. A light source as claimed in claim 1, wherein the bulb is free within the cavity.

14. A light source as claimed in claim 1, wherein the bulb is fixed in the cavity.

15. A light source as claimed in claim 14, wherein the bulb is sealed by fusing of a stem for the bulb to the waveguide.

16. A light source as claimed in claim 1, wherein the envelope of the bulb, plug (where provided) and waveguide are of vitreous material and are fixed or sealed together by local melting of the material.

17. A light source as claimed in claim 1, wherein the envelope of the bulb, plug (where provided) and waveguide are of vitreous material and are fixed or sealed together by local melting of frit material.

18. A light source as claimed in claim 5, wherein the bulb is retained in the cavity by the Faraday cage.

19. A light source as claimed in claim 5, wherein the bulb is retained in the cavity by a tube of dielectric material.

20. A light source as claimed in claim 19, wherein the surface at which the cavity opens is a back surface of the lucent waveguide and the tube is retained by a portion of the Faraday cage.

21. A light source as claimed in claim 1, wherein the bulb has an extension locating in an inner end of the tube.

22. A light source as claimed in claim 1, further comprising a tube, wherein the tube provides the antenna re-entrant.

23. A light source as claimed in claim 1, wherein the Faraday cage includes a solid portion extending across a back of the lucent waveguide to a transverse extent thereof and a clamp clamping the solid portion and the waveguide together and connecting the solid portion to a light-transmitting, front portion of the Faraday cage.

24. A light source as claimed in claim 23, wherein in the solid portion is reflective, for directing light forwards.

25. A light source as claimed in claim 24, wherein the lucent wave guide and the solid portion of the waveguide are complementarily shaped for emitted light focus.

26. A light source as claimed in claim 23, wherein the light transmitting forward portion of the Faraday cage includes a reticular metallic element.

27. A light source as claimed in claim 23, wherein the light transmitting forward portion of the Faraday cage includes a lucent, conductive coating.

28. A light source as claimed in claim 1, wherein the Faraday cage includes at least one aperture for locally increasing light transmission therethrough.

29. A light source as claimed in claim 28, wherein the aperture is no bigger than one tenth of the free space wave length of the microwaves in the crucible.

30. A light source as claimed in claim 1, wherein the lucent waveguide is of quartz or polycrystalline alumina or polycrystalline Yttrium Aluminium Garnet or aluminium nitride or single crystal sapphire.

31. A light source as claimed in claim 1, in combination with a separate reflector to reflect light emitted from the lucent crucible in a particular direction.

32. A light source as claimed in claim 1, in combination as a lamp with a microwave drive circuit comprising:
    a microwave source and
    a matching circuit.

* * * * *